United States Patent
Aoki (10) Patent No.: US 12,478,984 B2
(45) Date of Patent: Nov. 25, 2025

(54) CENTRIFUGAL FIELD FLOW FRACTIONATION DEVICE

(71) Applicant: SHIMADZU CORPORATION, Kyoto (JP)

(72) Inventor: Kengo Aoki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 707 days.

(21) Appl. No.: 17/781,631

(22) PCT Filed: Sep. 9, 2020

(86) PCT No.: PCT/JP2020/034108
§ 371 (c)(1),
(2) Date: Jun. 1, 2022

(87) PCT Pub. No.: WO2021/131174
PCT Pub. Date: Jul. 1, 2021

(65) Prior Publication Data
US 2023/0037872 A1    Feb. 9, 2023

(30) Foreign Application Priority Data

Dec. 24, 2019  (JP) ................................. 2019-232304

(51) Int. Cl.
| | | |
|---|---|---|
| *B04B 9/10* | (2006.01) | |
| *G01N 15/00* | (2024.01) | |
| *G01N 15/02* | (2024.01) | |

(52) U.S. Cl.
CPC ........... *B04B 9/10* (2013.01); *G01N 15/0255* (2013.01); *G01N 2015/0053* (2013.01); *G01N 2015/0288* (2013.01)

(58) Field of Classification Search
CPC ... B04B 9/10; B04B 5/0442; B04B 2005/045; B04B 11/02; B04B 13/00;
(Continued)

(56) References Cited

U.S. PATENT DOCUMENTS

| | | |
|---|---|---|
| 2014/0066280 A1 | 3/2014 | Welz |
| 2020/0001308 A1 | 1/2020 | Aoki et al. |

FOREIGN PATENT DOCUMENTS

| | | | |
|---|---|---|---|
| JP | 2014-518761 A | 8/2014 | |
| WO | WO-2018116442 A1 * | 6/2018 | ............... B03B 5/32 |

OTHER PUBLICATIONS

Notice of Reasons for Refusal for corresponding Japanese Patent Application No. 2021-566818 dated Mar. 17, 2023.

(Continued)

*Primary Examiner* — Claire X Wang
*Assistant Examiner* — Shuyi S. Liu
(74) *Attorney, Agent, or Firm* — Muir Patent Law, PLLC (57) ABSTRACT

A centrifugal field-flow fractionation device is provided with a controller for controlling introduction of a liquid sample by a sample introduction part and rotation of the rotor by a motor. The controller rotates the rotor at a first rotational speed when introducing the liquid sample into a flow path. The first rotational speed is faster than a second rotational speed. Therefore, when a liquid sample is introduced into the flow path, high centrifugal force can be applied to the liquid sample, which can suppress the variation of the particles in the liquid sample introduced to the flow path. The controller rotates the rotor at the second rotational speed slower than the first rotational speed with the liquid sample flow in the flow path stopped. Therefore, it is possible to prevent the constant application of high centrifugal force to the liquid sample, thereby suppressing the increase in the length of time required for analysis.

8 Claims, 9 Drawing Sheets

(58) Field of Classification Search
CPC ....... G01N 15/0255; G01N 2015/0053; G01N 2015/0288; G01N 15/042; G01N 2030/002; G01N 1/10; G01N 30/0005; G01N 2015/1415; G01N 1/38; G01N 15/1409; G01N 2291/02836; B01D 45/12; B01D 15/14; B01D 59/20
USPC ............. 435/3; 422/72, 81; 494/37, 1, 11, 7; 137/605
See application file for complete search history.

(56) References Cited

OTHER PUBLICATIONS

Written Opinion by the International Search Authority for PCT application No. PCT/JP2020/034108 dated Nov. 10, 2020, submitted with a machine translation.
Office Action dated Mar. 31, 2023, for corresponding patent application No. CN202080081574.X.

* cited by examiner

CENTRIFUGAL FIELD FLOW FRACTIONATION DEVICE

TECHNICAL FIELD

The present invention relates to a centrifugal field-flow fractionation device for classifying particles in a liquid sample in a flow path by centrifugal force by introducing a liquid sample into a flow path of a flow path member provided in an annular rotor and rotating the rotor.

BACKGROUND ART

As a method of classifying particles contained in a liquid sample in accordance with the specific gravity, a flow field fractionation method is known. For example, Patent Document 1 listed below discloses an example of a centrifugal field-flow fractionation device for classifying particles in a liquid sample by centrifugal force by introducing a liquid sample into a flow path and rotating the flow path.

A centrifugal field-flow fractionation device is provided with, for example, a rotor and a flow path member. The rotor is formed in an annular shape and is rotatably held centering a rotation axis. The flow path member is attached to the rotor and provided therein with an arc-shaped flow path extending along the inner peripheral surface of the rotor.

In this type of centrifugal field-flow fractionation device, by rotating the rotor to rotate the flow path member, centrifugal force can be applied to the liquid sample in the flow path. Consequently, the particles in the liquid sample can be classified in accordance with the specific gravity.

PRIOR ART DOCUMENT

Patent Document

Patent Document 1: Japanese Translation of PCT International Application Publication No. 2014-518761

SUMMARY OF THE INVENTION

Problems to be Solved by the Invention

In a centrifugal field-flow fractionation device, it usually takes a certain amount of time to introduce a liquid sample. Therefore, in a conventional centrifugal field-flow fractionation device, there arises a problem that the position of particles of a liquid sample in the flow path varies between the particles of the liquid sample supplied first and the particles of the liquid sample supplied later. Regarding this point, the details will be described below.

Figure 9:
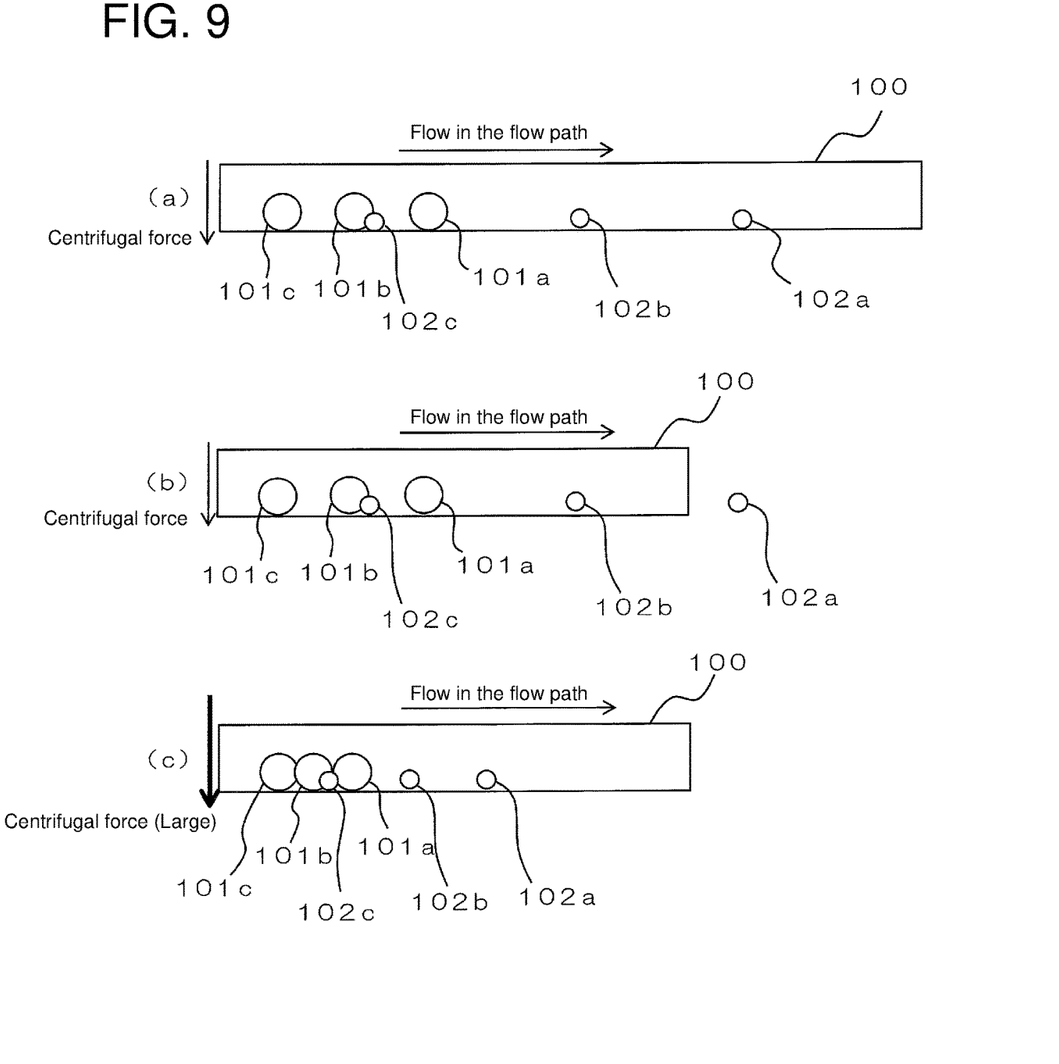
FIG. 9 is a diagram schematically showing a flow of a liquid sample in a conventional centrifugal field-flow fractionation device.

FIG. 9 is a diagram schematically illustrating a flow of a liquid sample in a conventional centrifugal field-flow fractionation device. FIGS. 9(a) to 9(c) show the states in which a liquid sample is supplied to a flow path in a state in which centrifugal force is applied to a flow path member 100 in the conventional centrifugal field-flow fractionation device. Further, the liquid sample includes a large-diameter particle 101 having a large particle diameter and a small-diameter particle 102 having a small particle diameter. Note that it is assumed that the material (density) of the large-diameter particle 101 and that of the small-diameter particle 102 are the same.

In FIGS. 9(a) to 9(c), as the particles of the liquid sample fed initially, a large-diameter particle 101a and a small-diameter particle 102a are illustrated. Further, as the particles of the liquid sample supplied next, a large-diameter particle 101b and a small-diameter particle 102b are illustrated. As the particles of the liquid sample most lately supplied, a large-diameter particle 101c and a small-diameter particle 102c are illustrated.

As shown in FIG. 9(a), in the centrifugal field-flow fractionation device, the particles of the liquid sample (the large-diameter particle 101a and the small-diameter particle 102a) initially supplied to the flow path move forward in accordance with the flow in the flow path. The particles of the liquid sample (the large-diameter particle 101b and the small-diameter particle 102b) supplied next and the particles of the liquid sample (the large-diameter particle 101c and the small-diameter particle 102c) supplied last are less likely to move forward in this order. Further, such variations of the particle position remarkably occur as the particle diameter reduces.

As described above, in a centrifugal field-flow fractionation device, the particles of the initially supplied liquid sample have a longer traveling distance in the flow path as compared with the particles of the later supplied liquid sample.

For this reason, even in a case where the particles have the same mass, the positions in the flow path differ depending on the timings at which the particles are supplied, which adversely affects the subsequent analyses and the like.

Further, as shown in FIG. 9(b), there is a case in which the capacity of the flow path member 100 is reduced. For example, in a case where it is desired to narrow a peak width of data to be detected, it is useful to reduce the capacity of the flow path member 100. However, in a case where the capacity of the flow path member 100 is reduced as described above, the sample (particles) supplied first may pass through the flow path to be flowed out of the flow path member 100.

Therefore, as shown in FIG. 9(c), in a centrifugal field-flow fractionation device, it is considered to increase the centrifugal force to be applied to the liquid sample. With this, it is possible to reduce the travel distance of the particles in the flow path, which in turn can reduce the positional deviation that occurred between the particle of the liquid sample supplied first and the particle of the liquid sample supplied later.

However, when the centrifugal force to be applied to the liquid sample is increased in this manner, there arises a problem that it takes a longer time to the analysis.

The above-described problem is likely to appear as a problem inherent in the centrifugal field-flow fractionation device for classifying particles in a liquid sample by centrifugal force.

The present invention has been made in view of the above-described circumstances. It is an object of the present invention to provide a centrifugal field-flow fractionation device capable of suppressing variations of particles in a liquid sample in a flow path and suppressing the time required for analysis from becoming long.

Means for Solving the Problem (1) A centrifugal field-flow fractionation device according to the present invention is provided with a rotor, a flow path member, a sample introduction part, a rotation drive unit, and a controller. The rotor is configured to rotate about a rotation axis. The flow path member is attached to the rotor. The flow path member is provided with a flow path therein, an inlet port for introducing a liquid sample to the flow path, and an outlet port for discharging the liquid sample from the flow path. The sample introduction part is configured to introduce the liquid sample from the inlet port into the flow path and flow the liquid sample in the flow path to the outlet port. The rotation drive unit is configured to rotate the rotor to classify particles in the liquid sample in the flow path by centrifugal force. The controller is configured to control introduction of the liquid sample by the sample introduction part and the rotation drive of the rotor by the rotation drive unit. The controller is configured to rotate the rotor at a first rotational speed when introducing the liquid sample into the flow path and rotate the rotor at a second rotational speed slower than the first rotational speed at the beginning of classifying the particles.

According to this configuration, in the centrifugal field-flow fractionation device, when introducing a liquid sample into the flow path, the rotor is rotated at the first rotational speed. The first rotational speed is faster than the second rotational speed.

Therefore, when the liquid sample is introduced into the flow path, high centrifugal force can be applied to the liquid sample.

As a result, it is possible to suppress the dispersion of the particles (the dispersion of the positions of the particles) in the liquid sample introduced into the flow path.

The rotor is rotated at the second rotational speed slower than the first rotational speed at the beginning of classification.

Therefore, it is possible to prevent the constant application of high centrifugal force to the liquid sample.

As a result, it is possible to suppress an increase in the time required for analysis.

(2) In the centrifugal field-flow fractionation device, it is difficult to rapidly change the rotational speed (centrifugal force) of the rotor. Therefore, the rotational speed of the rotor needs to be changed gradually, and therefore, a time is required.

In this viewpoint, it may be configured such that the controller decreases a rotational speed of the rotor from the first rotational speed to the second rotational speed within a period of time from after stopping a flow of the liquid sample in the flow path to resuming the flow.

According to such a configuration, while the rotational speed of the rotor is decreased from the first rotational speed to the second rotational speed, it becomes a state in which the flow of the liquid sample in the flow path is stopped.

Therefore, it is possible to stably perform the subsequent processing for the liquid sample.

(3) Further, it may be configured such that the controller decreases the rotational speed of the rotor from the first rotational speed to the second rotational speed within a period of time in which the liquid sample is being introduced into the flow path.

According to such a configuration, when the flow of the liquid sample in the flow path is stopped, the rotational speed of the rotor becomes the second rotational speed.

Therefore, it is possible to suppress the analysis time from becoming longer by the time for changing the rotational speed of the rotor.

(4) Further, it may be configured such that the controller starts an operation of decreasing a rotational speed from the first rotational speed to the second rotational speed during a period of time in which the liquid sample in the flow path is being introduced and stops a flow of the liquid sample in the flow path before a rotation speed of the rotor reaches the second rotation speed.

According to such a configuration, the rotational speed of the rotor can be changed over a period of time in which the liquid sample is being introduced into the flow path and a period of time in which the flow of the liquid sample in the flow path is stopped.

Therefore, it is possible to secure a long time for changing the rotational speed of the rotor.

(5) Further, it may be configured such that the controller includes a setting reception unit. The setting reception unit individually receives setting of the first rotational speed and that of the second rotational speed.

According to such a configuration, each of the first rotational speed and the second rotational speed can be individually set to a desired value.

(6) Further, it may be configured such that a plurality of bent portions or curved portions is repeatedly formed in the flow path of the liquid sample from the sample introduction part to the inlet port to average flow rates of the particles in the liquid sample flowing through the flow path.

According to such a configuration, the liquid sample from the sample introduction part repeatedly passes through the plurality of bent portions or curved portions, which averages the flow rates of the particles in the liquid sample.

Therefore, the liquid sample introduced into the flow path from the sample introduction part can be prevented from spreading in the flow path direction, which in turn can shorten the introduction time.

Effects of the Invention

According to the present invention, in the centrifugal field-flow fractionation device, when the liquid sample is being introduced into the flow path, the rotor is rotated at the first rotational speed. Therefore, it is possible to suppress the variation of the particles in the liquid sample introduced into the flow path. Further, the rotor is rotated at the second rotational speed slower than the first rotational speed in a state in which the flow of the liquid sample is stopped in the flow path. Therefore, it is possible to prevent a constant application of high centrifugal force to the liquid sample, which in turn can suppress the time required for analysis from becoming long.

EMBODIMENTS FOR CARRYING OUT THE INVENTION

1. Configuration of Analysis System

Figure 1:
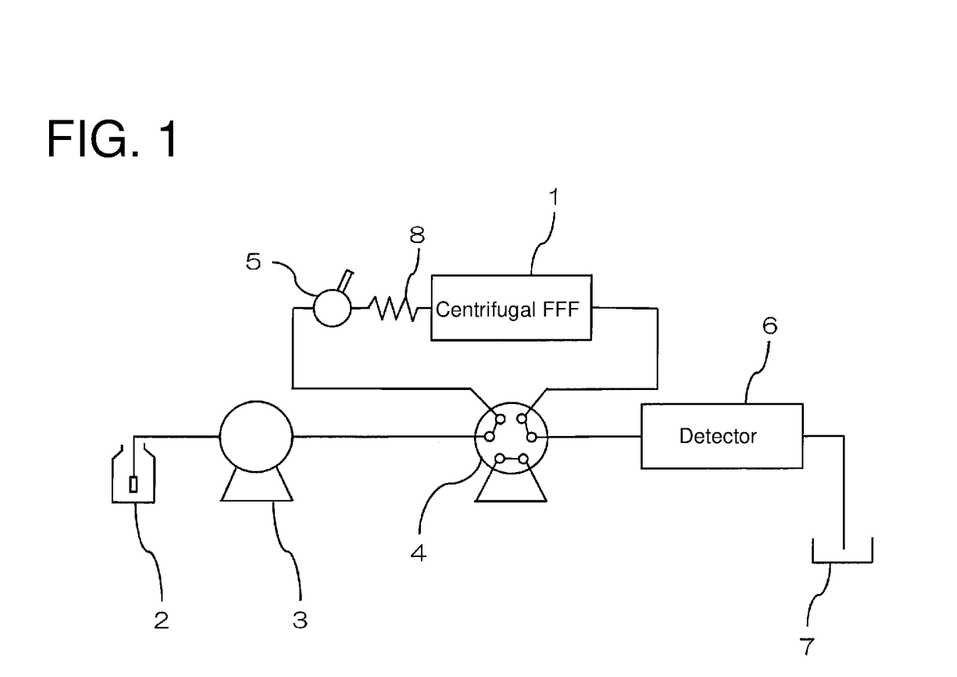
FIG. 1 is a schematic diagram showing a configuration example of an analysis system equipped with a centrifugal field-flow fractionation device according to a first embodiment of the present invention.

FIG. 1 is a schematic diagram showing a configuration example of an analysis system equipped with a centrifugal field-flow fractionation device 1 according to a first embodiment of the present invention. The centrifugal field-flow fractionation device 1 is a device for classifying particles contained in a liquid sample in accordance with the specific gravity using a flow field fractionation method. The analysis system shown in FIG. 1 is provided, in addition to the centrifugal field-flow fractionation device 1, with a carrier reservoir 2, a liquid feeding pump 3, a rotary valve 4, a sample injection device 5, a detector 6, a carrier recovery portion 7, and a flow rate adjuster 8.

In the carrier reservoir 2, a carrier fluid made of, for example, water or an organic solvent is stored. The carrier fluid is sent out from the carrier reservoir 2 by the liquid feeding pump 3 to be supplied to the centrifugal field-flow fractionation device 1 via the rotary valve 4. The sample injection device 5 is provided between the rotary valve 4 and the centrifugal field-flow fractionation device 1. The carrier fluid into which a sample has been injected from the sample injection device 5 is supplied to the centrifugal field-flow fractionation device 1 as a liquid sample.

The flow rate adjuster 8 is provided between the sample injection device 5 and the centrifugal field-flow fractionation device 1. In the flow rate adjuster 8, a plurality of bent portions or curved portions are repeatedly formed. The liquid sample contains a large number of particles to be analyzed. The flow rates of the particles are averaged as the liquid sample repeatedly passes through the bent portions or curved portions of the flow rate adjuster 8. Then, the liquid sample in that state flows into the centrifugal field-flow fractionation device 1.

The particles contained in the liquid sample are classified by being applied by the centrifugal force in the centrifugal field-flow fractionation device 1 and flow out of the centrifugal field-flow fractionation device 1 at different timings in accordance with the specific gravity. The particles sequentially flowing out of the centrifugal field-flow fractionation device 1 are sent to the detector 6 together with the carrier fluid via the rotary valve 4, detected by the detector 6, and then recovered by the carrier recovery portion 7. Starting or stopping the supply of the liquid sample to the centrifugal field-flow fractionation device 1 can be switched by rotating the rotary valve 4. The rotary valve 4, the liquid feeding pump 3, and the sample injection device 5 constitute an example of the sample introduction part.

Figure 2:
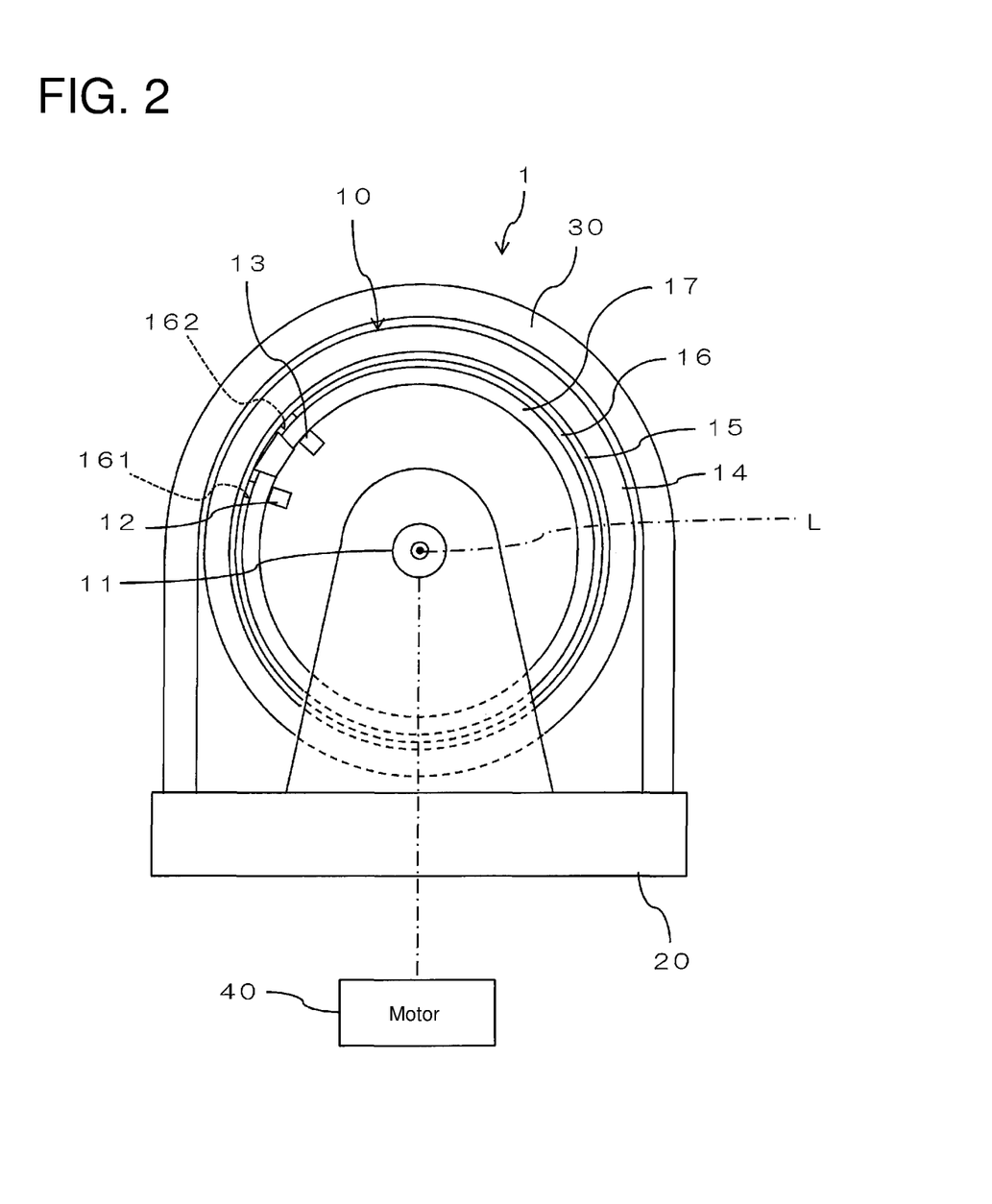
FIG. 2 is a schematic front view showing a configuration example of the centrifugal field-flow fractionation device shown in FIG. 1.

FIG. 2 is a schematic front view showing a configuration example of the centrifugal field-flow fractionation device 1. The centrifugal field-flow fractionation device 1 is configured by assembling the rotary unit 10 that rotates about the rotation shaft 11, a holding stand 20 for rotatably holding the rotation shaft 11, and a protective wall 30 for preventing the operator from coming into contact with the rotating rotary unit 10.

The rotary unit 10 is formed in, for example, a cylindrical shape and is held by the holding stand 20 such that the rotation shaft 11 attached to the center portion of the rotor extends in the horizontal direction. The protective wall 30 is, for example, a U-shaped member curved corresponding to the outer peripheral surface of the rotary unit 10 and is attached to the holding stand 20 to cover the outer peripheral surface of the rotary unit 10 in a state of facing the outer peripheral surface with a small gap therebetween.

The rotary unit 10 is configured as a cylindrical member as a whole by assembling, for example, a rotor 14, a spacer 15, a flow path member 16, and a fixing member 17.

The rotor 14 is an annular member with one end face closed by an end wall (not shown). To the end wall of the rotor 14, the rotation shaft 11 is fixed. With this, in accordance with the rotation of the rotation shaft 11, it is possible to rotate the rotor 14 about the rotation axis L coaxial with the rotation shaft 11.

In the space inside the rotor 14 (on the side of the rotation axis L), the spacer 15, the flow path member 16, and the fixing member 17 are accommodated. The spacer 15, the flow path member 16, and the fixing member 17 are each formed in an arc shape formed by curving an elongated member and are fixed in a state of being laminated in this order along the inner peripheral surface of the rotor 14.

The flow path member 16 is a thin plate shape and is formed in a C-shape with both end portions in the circumferential direction faced to each other with a gap therebetween. Inside the flow path member 16, a flow path (not shown) extending in the circumferential direction is formed.

At one end of the flow path member 16 in the circumferential direction, an inlet port 161 of a liquid sample to the flow path is formed. At the other end of the flow path member 16 in the circumferential direction, an outlet port 162 of a liquid sample from the flow path is formed. With this, the liquid sample flowed into the flow path from the inlet port 161 flows through the flow path along the circumferential direction from one end portion to the other end portion and flows out of the outlet port 162.

The fixing member 17 is formed, similar to the flow path member 16, in a C-shape with both end portions in the circumferential direction faced to each other with a gap therebetween. The fixing member 17 is provided along the inner peripheral surface of the flow path member 16 on the inner side of the flow path member 16 (on the side of the rotation axis L). The flow path member 16 is attached to the fixing member 17 by means of a fastening tool, such as, e.g., a bolt. The fixing member 17 to which the flow path member 16 is attached is fixed to the inner peripheral surface of the rotor 14 such that the flow path member 16 is sandwiched between the fixing member 17 and the rotor 14 via the spacer 15.

At both ends of the fixing member 17 in the circumferential direction, through-holes (not shown) are formed at the positions facing the inlet port 161 and the outlet port 162 of the flow path member 16. To the inner peripheral surface of the fixing member 17, an inlet 12 and an outlet 13 are attached so as to communicate with the respective through-holes. With this, the liquid sample introduced from the inlet 12 flows from the inlet port 161 into the flow path via one of the through-holes, flows through the flow path in the circumferential direction, and is then led out of the outlet port 162 via the other through-hole and the outlet 13.

The rotation shaft 11 is formed in a hollow shape, and a liquid sample is supplied from one end of the rotation shaft 11 to the inside of the rotation shaft 11. The inlet 12 and the outlet 13 of the rotary unit 10 communicate with each other in the rotation shaft 11 via piping (not shown).

To the rotation shaft 11, a motor 40, which is one example of the rotation drive unit, is coupled. By rotating the rotary unit 10 by driving the motor 40, centrifugal force can be applied to the liquid sample in the rotary unit 10. Note that the rotary unit 10 can be rotated using a rotation drive unit other than the motor 40.

When classifying the particles in the liquid sample, first, the rotary unit 10 is rotated by the motor 40, and the rotational speed of the rotary unit 10 gradually increases. In a state in which the rotational speed of the rotary unit 10 is kept constant, a liquid sample after passed through the flow rate adjuster 8 (see FIG. 1) is supplied to the rotation shaft 11. The liquid sample supplied to the inside of the rotation shaft 11 is introduced to the flow path in the rotary unit 10 (flow path member 16) from the inlet port 161 via the inlet 12.

After the liquid sample is introduced to the inside of the flow path for a certain period of time, the supply of the liquid sample is stopped by switching the rotary valve 4, and the rotary unit 10 is rotated as it is, whereby the particles in the liquid sample in the flow path are centrifuged and sedimented. Thereafter, the rotary valve 4 is switched to resume the liquid feeding in the flow path.

With this, in the order from the particles having a smaller specific gravity in the liquid sample, the particles are sent toward the downstream side in accordance with the flow of the liquid sample in the flow path and sequentially flow out of the outlet port 162. The liquid sample flowed out of the outlet port 162 passes through the inside of the rotation shaft 11, and then is sent to the detector 6. Thus, the particles in the liquid sample in the flow path are classified by the centrifugal force and flow out of the outlet port 162 at different timings in accordance with the specific gravity to be sent to the detector 6.

2. Electrical Configuration of Controller and Surrounding Members Thereof

Figure 3:
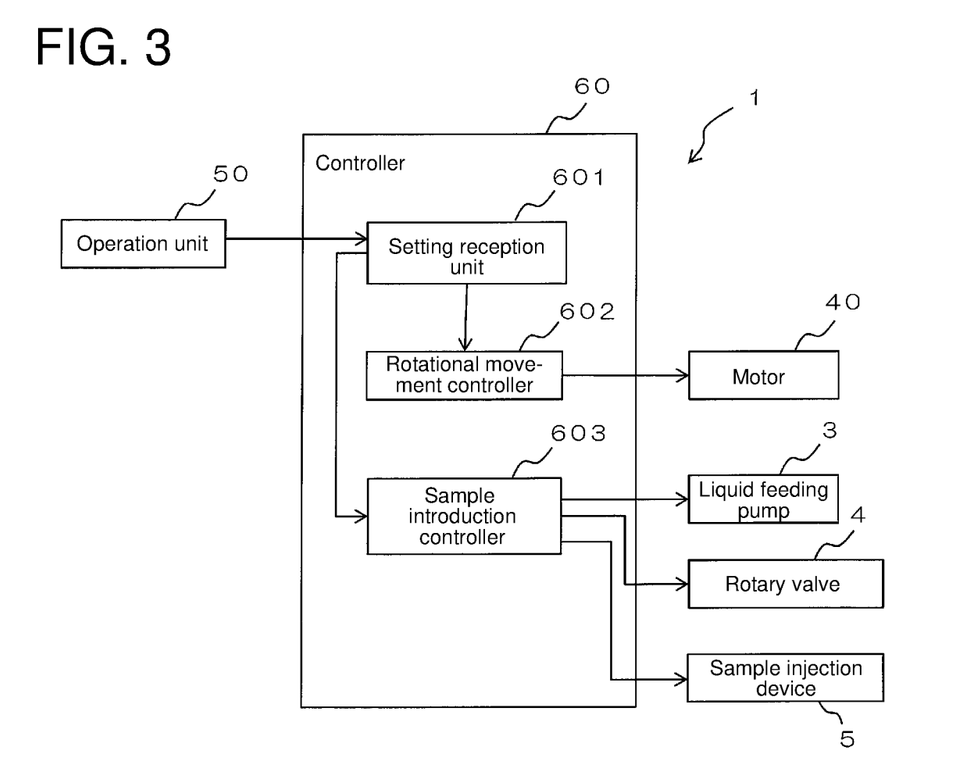
FIG. 3 is a block diagram showing an electric configuration of a controller and its peripheral members of the centrifugal field-flow fractionation device.

FIG. 3 is a block diagram showing an electrical configuration of a controller and its peripheral members of the centrifugal field-flow fractionation device 1.

The centrifugal field-flow fractionation device 1 is provided, in addition to the liquid feeding pump 3, the rotary valve 4, the sample injection device 5, and the motor 40 as described above, with an operation unit 50, a controller 60, and the like as electric configurations.

The operation unit 50 is a configuration including, for example, a keyboard and a mouse.

The controller 60 is a configuration including, for example, a CPU (Central Processing Unit). The controller 60 is electrically connected to the liquid feeding pump 3, the rotary valve 4, the sample injection device 5, the motor 40, the operation unit 50, and the like. The controller 60 functions as a setting reception unit 601, a rotational movement controller 602, a sample introduction controller 603, and the like by running programs.

The setting reception unit 601 accepts the setting for the rotational speed of the rotor 14 (rotary unit 10) and the time setting for the introduction of the liquid sample, in response to the operation of the operation unit 50 by the operator.

The rotational movement controller 602 controls the driving of the motor 40 based on the setting contents received by the setting reception unit 601.

The sample introduction controller 603 controls the operations of the liquid feeding pump 3, the rotary valve 4, and the sample injection device 5, based on the setting contents accepted by the setting reception unit 601.

3. Control Operation by Controller

Figure 4:
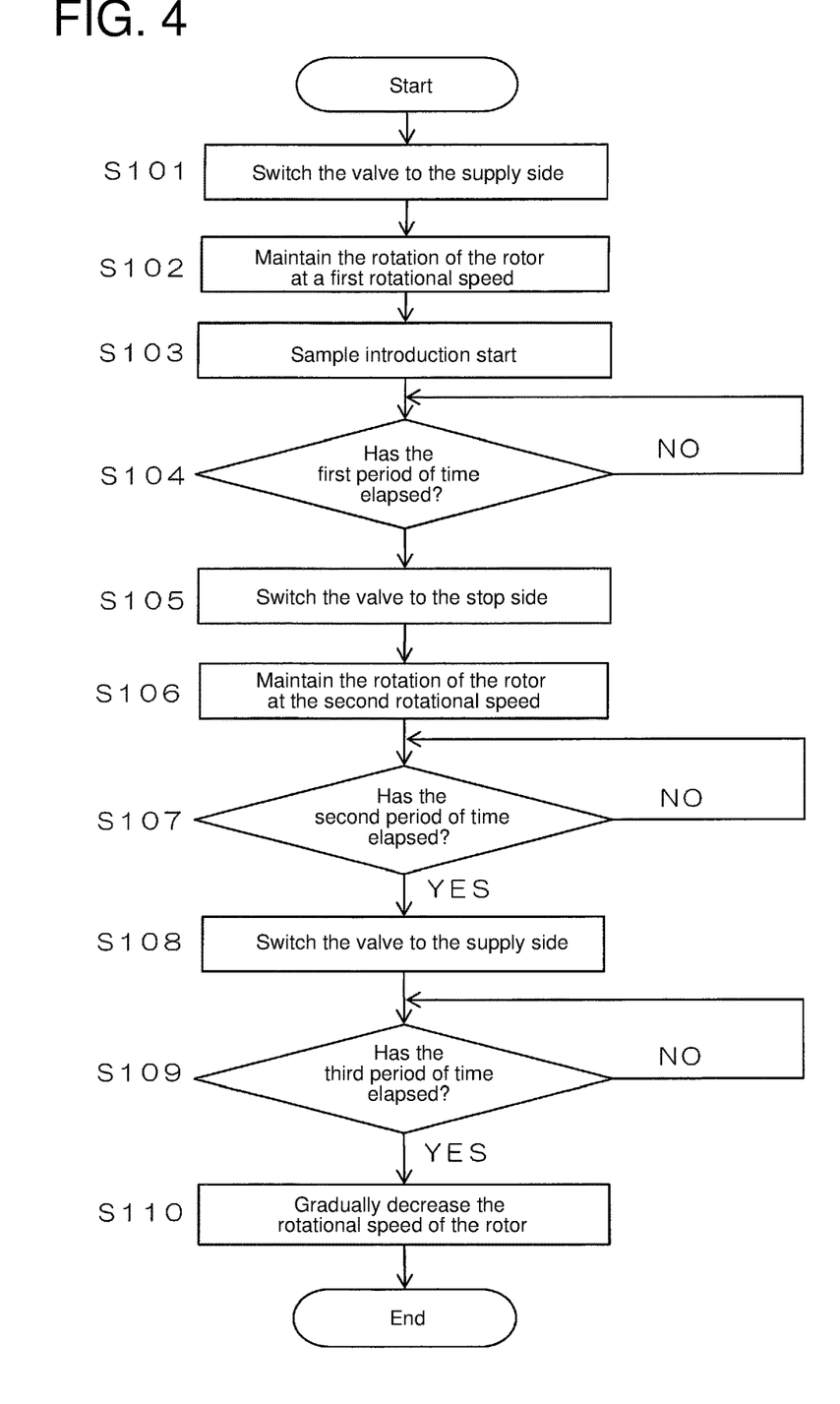
FIG. 4 is a flowchart showing control operations by a controller.
Figure 5:
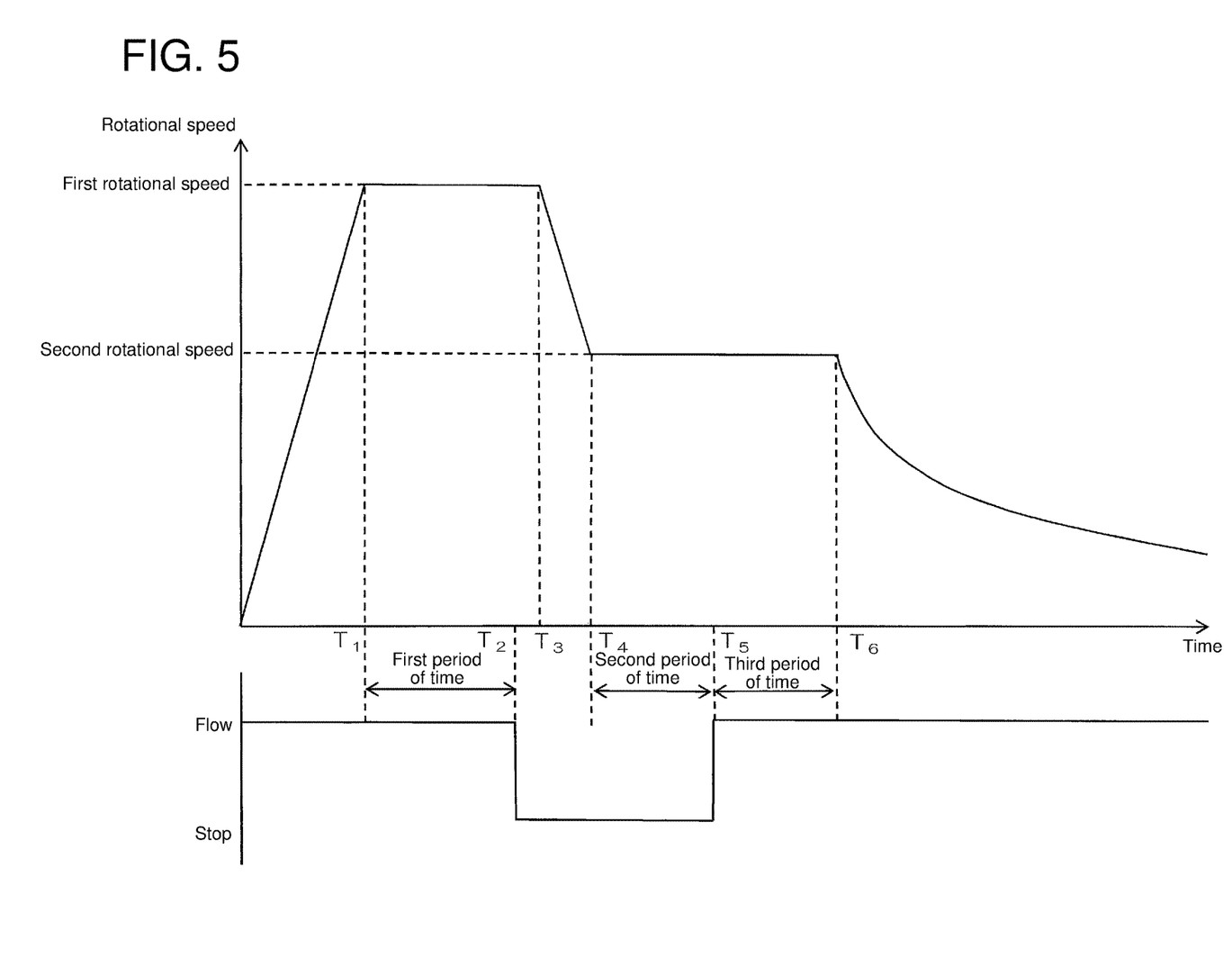
FIG. 5 is a graph showing a time-dependent change in a rotational speed of a rotary unit and a time-dependent change in a flow state of a flow path.

FIG. 4 is a flowchart illustrating the control operation performed by the controller 60. FIG. 5 is a graph showing the time-dependent change in the rotational speed of the rotary unit 10 and the time-dependent change in the flow state of the flow path (the on/off timing of the flow).

In the case of using the centrifugal field-flow fractionation device 1 (analysis system), the operator first operates the operation unit 50 to perform various settings. Specifically, the operator sets a first rotational speed and a second rotational speed as the rotational speed of the rotary unit 10 (rotor 14). Further, the operator sets a first period of time, a second period of time, and a third period of time with respect to the introduction of the liquid sample.

The first rotational speed is a rotational speed (number of revolutions) when the rotary unit 10 (rotor 14) is first rotated. The second rotational speed is a rotational speed when the rotary unit 10 (rotor 14) is rotated at the first rotational speed, and thereafter, the rotary unit 10 (rotor 14) is further rotated. Specifically, the first rotational speed is a rotational speed at the injection time (the number of revolutions at the injection time) at the time of injecting a liquid sample into the centrifugal field-flow fractionation device 1, and is, for example, 10,000 rpm. In the centrifugal field-flow fractionation device 1, the second rotational speed is a rotational speed (the initial rotational number) at which the particles in the liquid sample are classified and is, for example, 4,500 rpm.

The first period of time is a time (loading time) during which a liquid sample (a sample from the sample injection device 5) is injected to the inside of the centrifugal field-flow fractionation device 1. The second period of time is a time (relaxation time) during which the rotary unit 10 is rotated at a constant rotational speed in a state in which the liquid feed in the flow path is stopped. The third period of time is a time from when the liquid feeding in the flow path is resumed until the rotational speed of the rotary unit 10 starts to decrease.

The setting reception unit 601 individually accepts the settings inputted in accordance with the operation of the operation unit 50 by the operator.

Thereafter, the operator operates the operation unit 50 to start the operation of the centrifugal field-flow fractionation device 1 (analysis system).

Then, in the centrifugal field-flow fractionation device 1, under the control of the sample introduction controller 603, the operation of the liquid feeding pump 3 is started, and further, the rotary valve 4 is switched to the side for supplying a carrier fluid (Step S101).

This causes a carrier fluid from the carrier reservoir 2 to be introduced into the centrifugal field-flow fractionation device 1, which starts the liquid feeding in the flow path of the centrifugal field-flow fractionation device 1 (occurs the flow in the flow path).

Further, the rotational movement controller 602 drives the motor 40 to increase the rotational speed of the rotary unit 10 (the rotor 14). Then, the rotational movement controller 602 maintains the driving state of the motor 40 so that when the rotational speed of the rotor 14 reaches the first rotational speed accepted by the setting reception unit 601, the rotational speed of rotor 14 remains at the first rotational speed (in Step S102). Note that the rate at which the rotational speed is increased (the rotational speed increased per unit of time) has been predetermined.

Then, when the rotational speed of the rotor 14 reaches the first rotational speed, the sample introduction controller 603 operates the sample injection device 5 (Step S103). With this, the sample is injected into the carrier fluid to thereby introduce the liquid sample to the flow path of the centrifugal field-flow fractionation device 1. The time at this time is $T_1$.

With this, high centrifugal force is applied to the liquid sample introduced into the flow path to suppress the variation of the particles (the variation in the positions of the particles) in the liquid sample.

When the time from the start of the introduction of the liquid sample reaches the first period of time received by the setting reception unit 601 (YES in Step S104), the sample introduction controller 603 switches the rotary valve 4 to stop the liquid feeding (liquid sample circulation) in the flow path (Step S105). The time at this time is $T_2$.

Thereafter, the rotational movement controller 602 drives the motor 40 to reduce the rotational speed of the rotary unit 10 (rotor 14). The time at which the rotary unit 10 begins to decrease the rotational speed of the rotary unit 10 (rotor 14) is $T_3$. When the rotational speed of the rotor 14 becomes the second rotational speed received by the setting reception unit 601, the rotational movement controller 602 maintains the driving state in which the rotational speed of the rotor 14 maintains the drive state of the motor 40 so that the rotational speed of the rotor 14 becomes the second rotational speed (in Step S106). Note that the rate at which the rotational speed is decreased (the rotational speed decreased per unit time) has been predetermined. The time at which the rotational speed of the rotor 14 becomes the second rotational speed is $T_4$.

This state, i.e., the state in which the liquid feeding in the flow path is stopped and the rotary unit 10 (the rotor 14) is rotated at the second rotational speed, is maintained for a certain period of time, and therefore, the particles in the liquid sample in the flow path are distributed at positions corresponding to the sizes of the particles by the centrifugal force. For example, the large particles that received the strong centrifugal force are distributed closer to the wall side of the flow path as compared with the small particles that received the weak centrifugal force.

When the liquid feeding in the flow path is stopped and a time during which the rotor 14 is rotated at the second rotational speed has elapsed the second period of time (YES in Step S107), the sample introduction controller 603 switches the rotary valve 4 to resume the liquid feeding in the flow path (liquid sample circulation) (Step S108). The time at which the liquid feeding in the flow path is resumed is $T_5$ and the time of starting the classification. That is, the time of starting classification means a time when the liquid feeding in the flow path is resumed in a state in which the rotary unit 10 (the rotor 14) is rotating at a constant rate (second rotational speed).

With this, in the order from the particles having a smaller specific gravity in the liquid sample, the particles are sent to the detector 6 (see FIG. 1) with the flow of the liquid sample in the flow path.

Thereafter, when the time after the liquid feeding in the flow path is resumed has elapsed a third period of time (YES in Step S109), the rotational movement controller 602 starts to decrease the rotational speed of the rotary unit 10. The time at this time is $T_6$. Specifically, the rotational movement controller 602 drives the motor 40 to gradually reduce the rotational speed of the rotary unit 10 (the rotor 14) (Step S110). Even in this state, the particles in the liquid sample are fed to the detector 6 (see FIG. 1) in accordance with the flow of the liquid sample in the flow path.

Note that it may be configured such that the liquid sample is fed to the detector 6 in a state in which the rotational speed of the rotary unit 10 (the rotor 14) is maintained at the second rotational speed without decreasing the rotational speed of the rotary unit 10 in Step S109 and Step S110.

In this way, the particles in the liquid sample are detected by the detector 6. The analysis is performed based on the detected result of the detector 6. Upon completion of the analysis, the rotation of the rotary unit 10 is stopped, thereby completing the operation in the centrifugal field-flow fractionation device 1.

Figure 6:
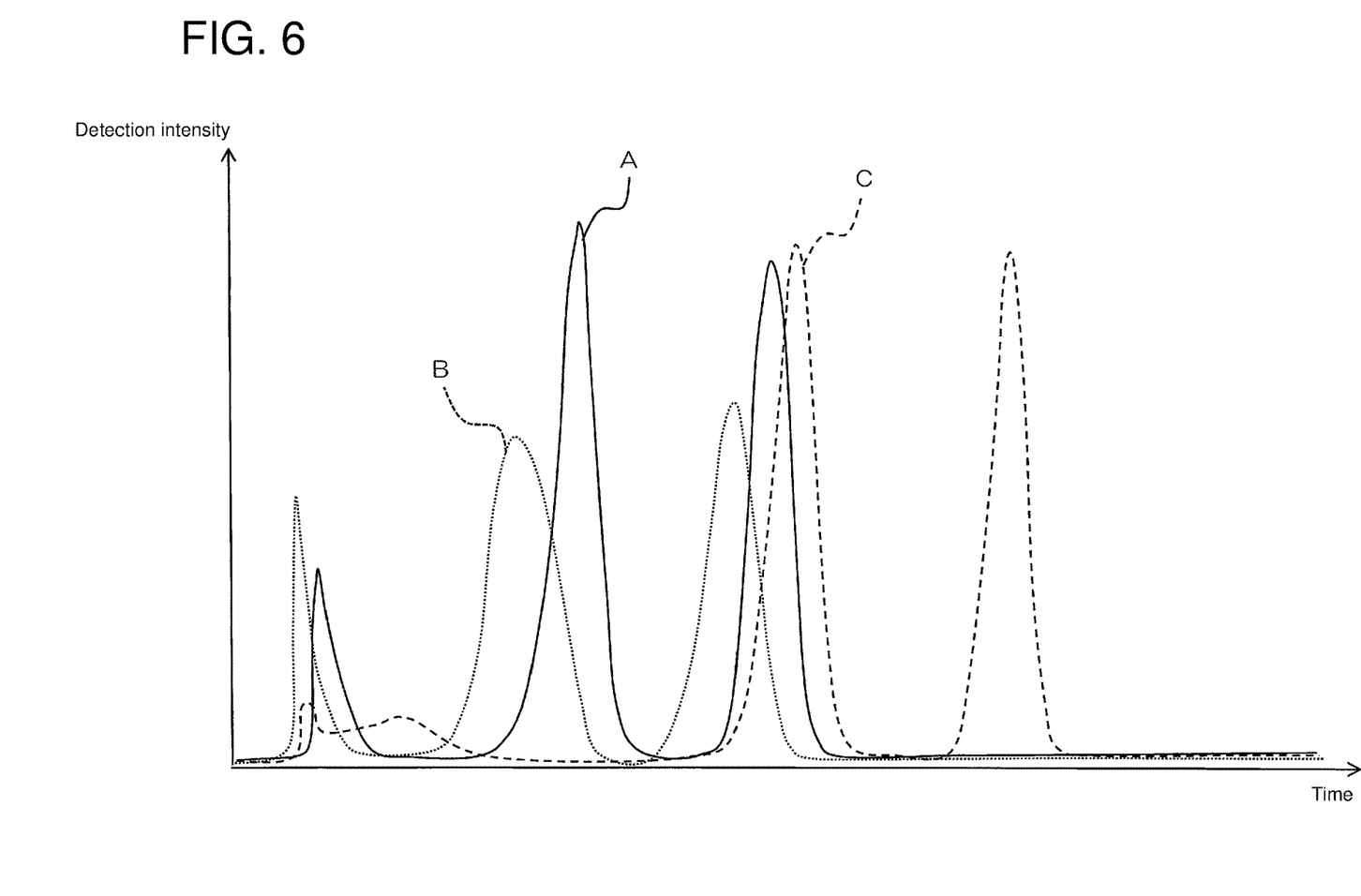
FIG. 6 is a graph showing a time-dependent change in the detection intensity of a detector when an analysis system is used.

FIG. 6 is a graph showing the time-dependent change in the detection intensity of the detector 6 when the analysis system is used. In FIG. 6, in the centrifugal field-flow fractionation device 1, a graph when the controller 60 performs the above-described control is shown as a graph A. Graphs when the rotary unit 10 is rotated by a conventional control are shown as B and C. More specifically, a graph when the rotary unit 10 is rotated at a rotational speed of 4,500 rpm (second rotational speed) at all times (at the time of introducing the sample, classifying the sample, resuming the flow) is shown as the graph B. A graph when the rotary unit 10 is rotated at a rotational speed of 10,000 rpm (first rotational speed) at all times (at the time of introducing the sample, classifying the sample, resuming the flow) is shown as the graph C.

From FIG. 6, in the centrifugal field-flow fractionation device 1, in a case where the controller 60 performs the above-described control (graph A), it can be confirmed that the peak shape is improved as compared with the case in which the rotary unit 10 is rotated at the second rotational speed (graph B) at all times. Specifically, it can be confirmed that the detection intensity of the peak of the graph A is higher than that of the peak of the graph B. Further, in the centrifugal field-flow fractionation device 1, in a case where the controller 60 performs the above-described control (graph A), it can be confirmed that the time required for the analysis is shortened as compared with the case of rotating the rotary unit 10 at the first rotational speed (graph C) all the time.

Further, although not illustrated, in the centrifugal field-flow fractionation device 1, it was confirmed that the peak of the detected data was improved when the controller 60 performed the above-described control and the centrifugal force generated at the first rotational speed became 10,000 G or more.

4. Effects (1) According to this embodiment, in the centrifugal field-flow fractionation device 1, the controller 60 rotates the rotor 14 at the first rotational speed when introducing the liquid sample into the flow path (Step S102, Step S103 in FIG. 4). The first rotational speed is faster than the second rotational speed.

Therefore, when a liquid sample is introduced to the inside of the flow path, high centrifugal force can be applied to the liquid sample.

As a result, it is possible to suppress the dispersion of the particles (the dispersion of the positions of the particles) in the liquid sample introduced to the inside of the flow path.

Further, in the centrifugal field-flow fractionation device 1, at the beginning of classification, the controller 60 rotates the rotor 14 at a second rotational speed slower than the first rotational speed (Step S106).

Therefore, it is possible to prevent high centrifugal force from being constantly applied to the liquid sample. As a result, it is possible to suppress an increase in the time required for analysis.

(2) Further, according to this embodiment, in the centrifugal field-flow fractionation device 1, the controller 60 decreases the rotational speed of the rotor 14 from the first rotational speed to the second rotational speed after stopping the flow of the liquid sample in the flow path (Step S105) until resuming the flow (see FIG. 5).

Therefore, during the period in which the rotational speed of the rotor 14 is reduced from the first rotational speed to the second rotational speed, it becomes a state in which the flow of the liquid sample in the flow path is stopped.

Consequently, it is possible to stably perform the treatment (relaxation) on the liquid sample.

(3) Further, according to this embodiment, the setting reception unit 601 individually accepts the first rotational speed setting and the second rotational speed setting.

Therefore, each of the first rotational speed and the second rotational speed can be individually set to a desired value.

(4) Further, according to this embodiment, as shown in FIG. 1, the flow rate adjuster 8 is provided in the flow path of the liquid sample between the sample injection device 5 and the inlet port 161. In the flow rate adjuster 8, a plurality of bent portions or curved portions is repeatedly formed.

Therefore, the flow rates of the particles in the liquid sample are averaged as the liquid sample repeatedly passes through the bent portions or the curved portions of the flow rate adjuster 8.

As a result, the liquid sample introduced to the inside of the flow path can be restrained from spreading in the flow path direction, and the introduction time can be shortened.

5. Second Embodiment

Hereinafter, other embodiments according to the present invention will be described using FIG. 7 and FIG. 8. Note that the same component as that of the first embodiment is assigned by the same reference numeral as that described above, and the description thereof will be omitted.

Figure 7:
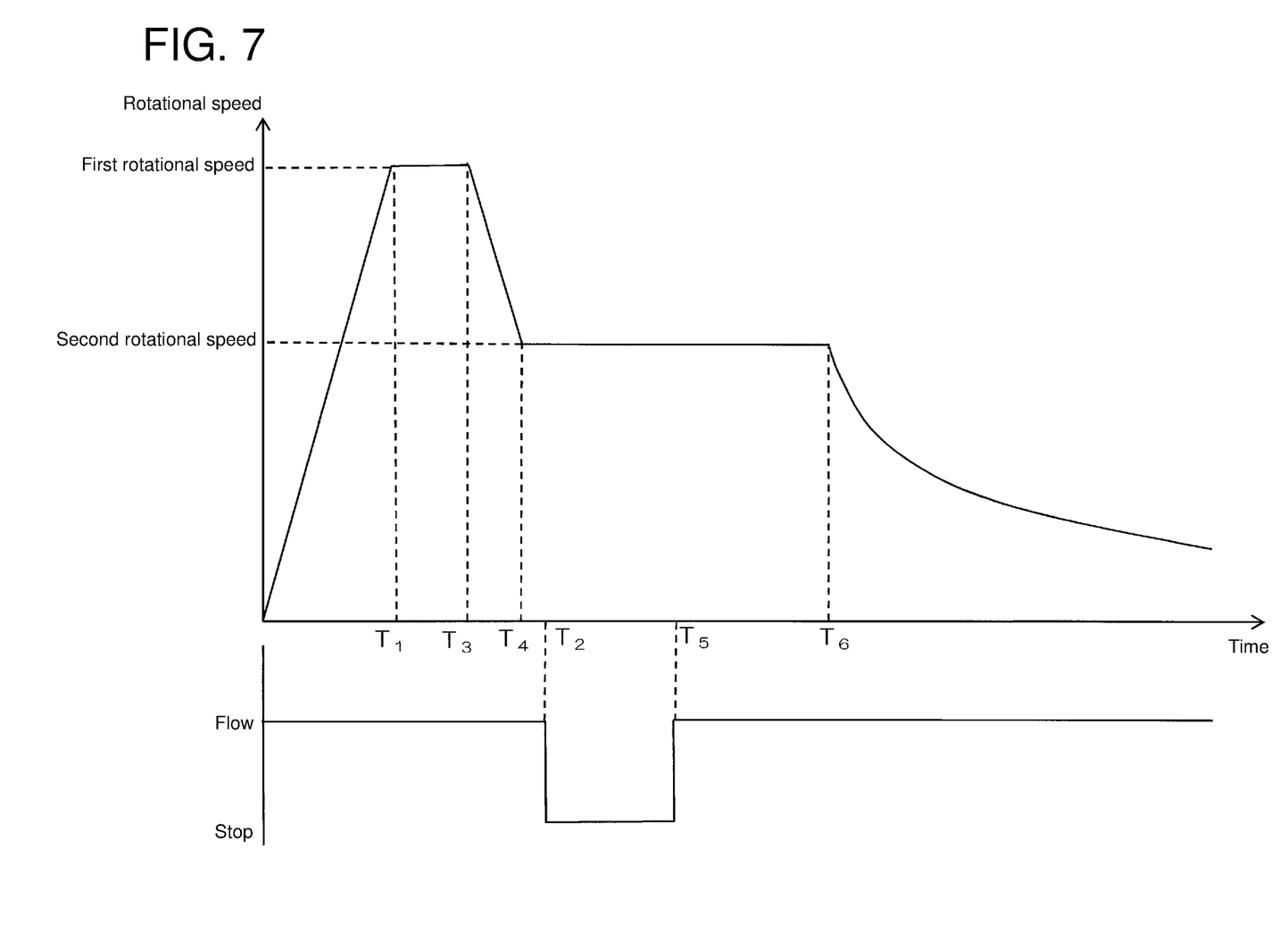
FIG. 7 is a graph showing a time-dependent change in a rotational speed of a rotary unit and the time-dependent change in a flow state of a flow path in a centrifugal field-flow fractionation device according to a second embodiment of the present invention.

FIG. 7 is a graph showing a time-dependent change in the rotational speed of the rotary unit 10 and a time-dependent change in the flow state of the flow path in the centrifugal field-flow fractionation device 1 according to a second embodiment of the present invention.

In the second embodiment, the timing of decreasing the rotational speed of the rotor 14 from the first rotational speed to the second rotational speed differs from that in the first embodiment.

Specifically, in the second embodiment, the controller 60 (the rotational movement controller 602) decreases the rotational speed of the rotor 14 from the first rotational speed to the second rotational speed during the period in which the liquid sample is being introduced to the inside of the flow path.

The time $T_4$ at which the rotational speed of the rotor 14 becomes the second rotational speed is earlier than the time $T_2$ at which the flow in the flow path (flow of the liquid sample) is stopped.

That is, in the second embodiment, as the control operation of the controller 60, after Step S103 of FIG. 4, a step of decreasing the rotational speed of the rotor 14 to the second rotational speed is added. Further, in the second embodiment, Step S106 of FIG. 4 is not performed.

As described above, according to the second embodiment, the controller 60 decreases the rotational speed of the rotor 14 from the first rotational speed to the second rotational speed during the period in which the liquid sample is being introduced to the inside of the flow path.

For this reason, when the flow of the liquid sample in the flow path is stopped, the rotational speed of the rotor 14 becomes the second rotational speed.

Consequently, it is possible to suppress the increase in the analysis time by the time for changing the rotational speed of the rotor 14.

Also, while the rotor 14 is rotating, the pressure due to the back pressure and the centrifugal force is applied to the fluid in the flow path member 16. Among them, the pressure due to the centrifugal force changes depending on the magnitude of the centrifugal force. That is, the pressure applied to the liquid in the flow path member 16 differs between when the rotational speed of the rotor 14 is the first rotational speed and when the rotational speed of the rotor 14 is the second rotational speed. Specifically, when the rotational speed of the rotor 14 is the first rotational speed, higher pressure is applied to the liquid in the flow path member 16. When the rotational speed of the rotor 14 is the second rotational speed, lower pressure is applied to the liquid in the flow path member 16.

When a large pressure fluctuation occurs in the liquid in the flow path during the time from when the flow of the liquid sample is stopped to when the flow is resumed, there is a possibility that it may advertently affect the analysis result.

In the second embodiment, the rotational speed of the rotor 14 can be maintained at the same rotational speed (the second rotational speed) at the time ($T_2$) at which the flow of the liquid sample in the flow path is stopped and at the point in time ($T_5$) at which the flow of the liquid sample in the flow path is resumed.

It is, therefore, possible to suppress that the pressure fluctuations on the liquid in the flow path adversely affect on the analysis result.

6. Third Embodiment

Figure 8:
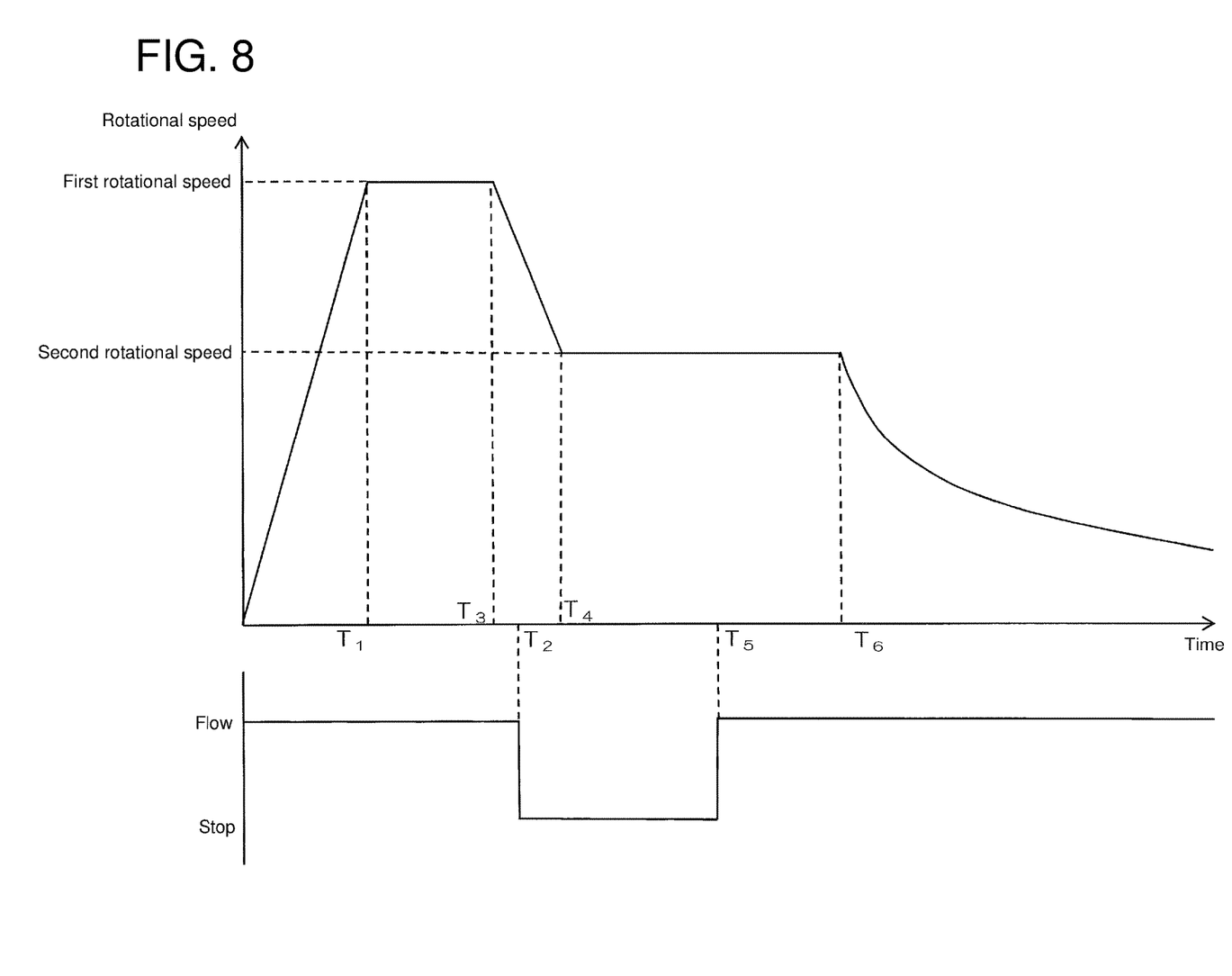
FIG. 8 is a graph showing a time-dependent change in a rotational speed of a rotary unit and a time-dependent change in a flow state of a flow path in a centrifugal field-flow fractionation device according to a third embodiment of the present invention.

FIG. 8 is a graph showing a time-dependent change in the rotational speed of the rotary unit 10 and a time-dependent change in the flow state of the flow path in the centrifugal field-flow fractionation device 1 according to a third embodiment of the present invention.

In the third embodiment, the timing at which the rotational speed of the rotor 14 is decreased from the first rotational speed to the second rotational speed differs from that in the first embodiment and the second embodiment.

Specifically, in the third embodiment, the controller 60 (the rotational movement controller 602) starts the operation of reducing the rotational speed of the rotor 14 from the first rotational speed to the second rotational speed while the liquid sample is being introduced to the inside of the flow path, and stops the flow of the liquid sample in the flow path before the rotational speed of the rotor 14 is reduced from the first rotational speed to the second rotational speed.

That is, the time $T_3$ at which the rotational speed of the rotor 14 starts to decrease from the first rotational speed is before the time $T_2$ at which the liquid flow (flow of the liquid sample) in the flow path is stopped. Further, the time $T_4$ at which the rotational speed of the rotor 14 becomes the second rotational speed is after the time $T_2$ at which the liquid feeding (the flow of the liquid sample) in the flow path is stopped.

In the third embodiment, as the control operation of the controller 60, a step of starting the decrease of the rotational speed of the rotor 14 is added after Step S103 of FIG. 4.

As described above, according to the third embodiment, the controller 60 decreases the rotational speed of the rotor 14 from the first rotational speed to the second rotational speed over the period of time during which the liquid sample is introduced to the inside of the flow path and the period of time during which the liquid sample flow in the flow path is stopped.

Therefore, it is possible to secure a long time for changing the rotational speed of the rotor 14.

Further, in the third embodiment, it is possible to reduce the difference between the rotational speed of the rotor 14 at the time $T_2$ at which the flow of the liquid sample in the flow path is stopped and the rotational speed of the rotor 14 at the time $T_5$ at which the flow of the liquid sample in the flow path is resumed.

It is, therefore, possible to suppress the pressure fluctuations on the liquid in the flow path from affecting on the analysis result.

DESCRIPTION OF SYMBOLS

1: Centrifugal field-flow fractionation device
3: Liquid feeding pump
4: Rotary valve
5: Sample injection device
8: Flow rate adjuster
10: Rotary unit
14: Rotor
16: Flow path member
40: Motor
60: Controller
161: Inlet port
162: Outlet port
601: Setting reception unit
602: Rotational movement controller
603: Sample introduction controller

The invention claimed is:

1. A centrifugal field-flow fractionation device comprising:
 a rotor configured to rotate about a rotation axis;
 a flow path member formed in an arc-shape centering the rotation axis, the flow path member being attached to the rotor, the flow path member being provided with a flow path therein, an inlet port for introducing a liquid sample to the flow path, and an outlet port for discharging the liquid sample from the flow path;
 a sample introduction part configured to introduce the liquid sample from the inlet port into the flow path and flow the liquid sample in the flow path to the outlet port;
 a rotation drive unit configured to rotate the rotor to classify particles in the liquid sample in the flow path by centrifugal force; and
 a controller configured to control introduction of the liquid sample by the sample introduction part and rotation drive of the rotor by the rotation drive unit,
 wherein the controller is configured to stop a flow of the liquid sample in the flow path once after an introduction of the liquid sample into the flow path has started and resume the flow, and rotate the rotor at a first rotational speed when introducing the liquid sample into the flow path and rotate the rotor at a second rotational speed slower than the first rotational speed before the flow of the liquid sample is resumed.

2. The centrifugal field-flow fractionation device as recited in claim 1,
 wherein the controller decreases a rotational speed of the rotor from the first rotational speed to the second rotational speed during a period of time which occurs between stopping the flow of the liquid sample into the flow path and resuming the flow of the liquid sample into the flow path.

3. The centrifugal field-flow fractionation device as recited in claim 1,
 wherein the controller decreases a rotational speed of the rotor from the first rotational speed to the second rotational speed while the liquid sample is being introduced into the flow path.

4. The centrifugal field-flow fractionation device as recited in claim 1,
 wherein the controller starts an operation of decreasing a rotational speed from the first rotational speed to the second rotational speed while the liquid sample is being introduced into the flow path and stops the flow of the liquid sample into the flow path before a rotation speed of the rotor reaches the second rotational speed.

5. The centrifugal field-flow fractionation device as recited in claim 1,
 wherein the controller receives setting of the first rotational speed and that of the second rotational speed.

6. The centrifugal field-flow fractionation device as recited in claim 1,
 wherein a plurality of bent portions or curved portions is repeatedly formed in an adjustment flow path disposed between the sample introduction part and the inlet port to average flow rates of the particles in the liquid sample flowing through the flow path.

7. A centrifugal field-flow fractionation device comprising:
 a rotor configured to rotate about a rotation axis;
 a flow path member formed in an arc-shape centering the rotation axis, the flow path member being attached to the rotor, the flow path member being provided with a flow path therein, an inlet port for introducing a liquid sample to the flow path, and an outlet port for discharging the liquid sample from the flow path;
 a sample introduction part configured to introduce the liquid sample from the inlet port into the flow path and flow the liquid sample in the flow path to the outlet port;
 a rotation drive unit configured to rotate the rotor to classify particles in the liquid sample in the flow path by centrifugal force; and
 a controller configured to control introduction of the liquid sample by the sample introduction part and rotation drive of the rotor by the rotation drive unit,
 wherein the controller is configured to rotate the rotor at a first rotational speed when introducing the liquid sample into the flow path and rotate the rotor at a second rotational speed slower than the first rotational speed, and
 wherein the controller decreases a rotational speed of the rotor from the first rotational speed to the second rotational speed during a period of time which occurs between stopping a flow of the liquid sample into the flow path and resuming the flow of the liquid sample into the flow path.

8. A centrifugal field-flow fractionation device comprising:
   a rotor configured to rotate about a rotation axis;
   a flow path member formed in an arc-shape centering the rotation axis, the flow path member being attached to the rotor, the flow path member being provided with a flow path therein, an inlet port for introducing a liquid sample to the flow path, and an outlet port for discharging the liquid sample from the flow path;
   a sample introduction part configured to introduce the liquid sample from the inlet port into the flow path and flow the liquid sample in the flow path to the outlet port;
   a rotation drive unit configured to rotate the rotor to classify particles in the liquid sample in the flow path by centrifugal force; and
   a controller configured to control introduction of the liquid sample by the sample introduction part and rotation drive of the rotor by the rotation drive unit,
   wherein the controller is configured to rotate the rotor at a first rotational speed when introducing the liquid sample into the flow path and rotate the rotor at a second rotational speed slower than the first rotational speed, and
   wherein the controller starts an operation of decreasing a rotational speed from the first rotational speed to the second rotational speed while the liquid sample is being introduced into the flow path and stops the flow of the liquid sample into the flow path before a rotation speed of the rotor reaches the second rotational speed.

* * * * *